United States Patent
Lin et al.

(10) Patent No.: US 7,263,537 B1
(45) Date of Patent: Aug. 28, 2007

(54) SYSTEM AND METHOD FOR CREATING MULTIPLE QUIESCE DATABASE COPIES AT A SINGLE SERVER

(75) Inventors: Kung Yi Lin, Irvine, CA (US); Shawmo Edmund Lin, Mission Viejo, CA (US); Shirley Jean Ritsch, Lake Forest, CA (US); Donald Ralph Hart, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 459 days.

(21) Appl. No.: 10/927,384

(22) Filed: Aug. 26, 2004

Related U.S. Application Data

(60) Provisional application No. 60/543,460, filed on Feb. 9, 2004.

(51) Int. Cl.
*G06F 17/30* (2006.01)

(52) U.S. Cl. .................................................. 707/204
(58) Field of Classification Search ................ 707/1, 707/2, 9, 10, 204, 154; 709/224
See application file for complete search history.

(56) References Cited

U.S. PATENT DOCUMENTS

| 6,044,444 A | 3/2000 | Ofek |
| 6,934,725 B1 * | 8/2005 | Dings .......................... 707/204 |
| 2003/0159007 A1 * | 8/2003 | Sawdon et al. ............. 711/154 |

* cited by examiner

*Primary Examiner*—Etienne LeRoux
(74) *Attorney, Agent, or Firm*—Alfred W. Kozak; Charles A. Johnson; Beth L. McMahon

(57) ABSTRACT

A method for creating multiple QUIESCE DATABASE Copies (QDC) on a single server by mirroring a disk copy of a live database that is in a quiesced state and splitting them from their source, and then bringing the mirrored disks containing online snapshots back online to the server.

3 Claims, 4 Drawing Sheets

SYSTEM AND METHOD FOR CREATING MULTIPLE QUIESCE DATABASE COPIES AT A SINGLE SERVER

This application was originally filed as a Provisional on Feb. 9, 2004 and given U.S. Ser. No. 60/543,460.

FIELD OF THE INVENTION

This invention teaches a method of capturing a physically consistent snapshot of an online database that can be configured and processed simultaneously at the same server as the online database it is created from.

CROSS-REFERENCE TO RELATED APPLICATIONS

This application is related to U.S. Pat. No. 6,430,577 entitled "System and Method For Asynchronously Receiving Multiple Packets of Audit Data From a Source Data-based Host In a Resynchronization Mode And Asnychronously Writing The Data To a Target Host"; and also, U.S. Pat. No. 6,446,090 entitled "Tracker Sensing Method For Regulating Synchronization of Audit Files Between Primary and Secondary Hosts", and U.S. Pat. No. 6,408,310 entitled "System and Method For Expediting Transfer of Sectioned Audit Files From a Primary Host to a Secondary Host", each of which are incorporated herein by reference.

This application is also related to U.S. Pat. No. 6,877,016 B1 entitled "Method of Capturing A Physically Consistent Mirrored Snapshot Of An Online Database", and U.S. Pat. No. 6,983,291 B1 entitled "System And Method For Database Recovery Using A Mirrored Snapshot Of An Online Database", and U.S. Ser. No. 10/235,763 entitled "Method For Capturing A Physically Consistent Mirrored Snapshot Of An Online Database From A Remote Database Backup System", and U.S. Pat. No. 7,051,052 B1 entitled "System And Method For Reading Audit Data From Remote Mirrored Disk For Applications To Remote Database Backup Copy", each of which are also incorporated herein by reference.

BACKGROUND OF THE INVENTION

The Unisys Corp Enterprise Database Server (DMSII) provides a QUIESCE option that enables the creation of a QDC (Quiesce Database Copy) having a different usercode and familyname from the primary online database. A QDC begins as a mirrored target family of disks that are mirrored from a mirrored source family of disks. The process of creating a QDC requires (1) a DMUTILITY QUIESCE QDC command, issued to a primary online database whose data files reside on a mirrored source family of disks, to configure a usercode and familyname that are different from the online database, (2) splitting of the mirrored target family of disks, (3) a DMUTILITY RESUME command to reactivate the primary online database, (4) renaming and acquiring the split target family of disks, (5) a DMCONTROL CREATE QDC command that changes the usercode of all database files that reside on the target family of disks and stores the new family locations in the control file of the (QDC) Quiesce Database Copy.

It should be noted that a feature exists which allows up to 15 physically consistent snapshots to be configured and processed simultaneously at the same server as the online database it is created from. Normally multiple servers would be required to accomplish this type of operation.

The process of taking a database system "off-line" is counter-productive to the goal of maintaining the database availability for 24 hours a day, 7 days a week and 365 days a year. Currently, with the present types of database systems, a database system must be taken off-line to create a physically consistent snapshot for the purpose of offloading database processing in a mirrored disk environment. The present invention provides for the capability of creating a "physically consistent snapshot" while the database system still remains on-line.

Users of data processing systems who are required to maintain large volumes of data must make provisions to ensure that backup data is available in case of some disaster or power shutdown. For example, banks, insurance companies, stock market traders, financial institutions, who require large databases would be put into a difficult position should a failure occur which would render the database unavailable.

Thus, data processing system users will be seen to arrange to maintain copies of their valuable data on the same site or on some other storage media, or as in the present situation, make use of a secondary "mirrored" storage device which is located in communication with the main storage device. Thus, should some problem or disaster occur, then both the primary storage of data, as well as the secondary or backed-up data storage (which would ordinarily be unavailable to the host), could later be made available through the remote storage of the backup data.

One problem that occurs in prior art data storage systems, is where they use a method of data mirroring, wherein one host CPU or processor writes data to both the primary storage device, as well as a secondary data storage device. However, this leads to problems because this overly burdens the host CPU with the task of writing data not only to the primary data storage system, but also to the secondary data storage system, and therefore can reduce system performance.

In the present invention, there is indicated a method of creating a physically consistent database from an on-line database system for the purpose of capturing a physically consistent mirrored snapshot of the database. A logically consistent database is maintained for an on-line database system by reading data from physical disk storage and temporarily storing the data in active memory storage. The data stored however, in memory, can undergo many changes that are activated by on-line database applications. These changes result in a database that is "not physically consistent" while the database system remains on-line. Thus, it can be understood that—the only method of securing a physically consistent database is to take the database system off-line.

Physical consistency of a database is most desirable in a mirrored-disk environment, whereby mirrored copies can be split from their original source. The mirrored copies represent point-in-time snapshots of a physically consistent database. These snapshots can be used to off-load processing from the "original" database system thereby improving performance of the original system. Thus, by creating a physically consistent database from an online database system, there would be no need to take the primary system off-line, whereby there would be increased database availability.

The present invention relates to the method of creating an external physically consistent database from an on-line database system. An on-line database system maintains a logically consistent database by (i) reading data from disk storage into a system memory storage, then (ii) making changes to data by updating system memory storage, and then (iii) writing then changed data to disk storage at periodic intervals. When there are no active users of a database system, all the modified or changed data is written from the system memory storage to the disk storage, and then the system can be taken off-line with the database in a physically consistent state. However, with the advent of physically mirrored disk storage, database system process off-loading of a physically consistent copy is enabled and the performance can be improved, whereby the primary system remains available for normal operations and the secondary system is available for "inquiry" or "read-only" operations.

As previously noted, the process of taking a normal database system off-line is counter-productive to the goal of maintaining 24 hour, 7 day a week, 365 days a year of database availability. Thus, if a physically consistent database could be created from an on-line database system, the database availability will still be maintained while the system performance is improved when a physically mirrored snapshot is used to off-load the processing.

An example of such a remote mirroring system is illustrated in U.S. Pat. No. 6,044,444 to Yuval Ofek of the EMC Corporation. This involves a data processing system which automatically and asynchronously, with respect to a first host system, generates and maintains a backup or "mirrored" copy of a primary storage device at a different location physically remote from the primary storage device. This is done without any intervention from the primary host which might seriously degrade the performance of the data transfer link between the primary host computer and its primary storage device.

U.S. Pat. No. 6,044,444 provides a method of mirroring physical storage in order to create a duplicate copy, described as a "physically mirrored snapshot". However, this U.S. Patent to Ofek of EMC Corporation does not teach or show any method that provides physical consistency in the duplicate copy.

SUMMARY OF THE INVENTION

Earlier systems for capturing a physically consistent snapshot of an on-line database required a first server and an additional server to process each snapshot simultaneously. The present method and system accomplishes this function with just a single server. Additionally, the new method allows a multiplicity of consistent snapshots to be configured and processed simultaneously at the very same server as that from which the source database functioned to replicate the consistent snap shot.

The object of this invention is to create multiple QUIESCE database copies at a single server in order to reduce application time for testing and development and to improve availability of live databases.

A QUIESCE QDC command is used to start creating a quiesce database copy of the live database on the same host. A quiesce database copy (QDC) is a mirrored disk copy of a live database that is in a quiesced state. This QUIESCE QDC command places the live database in a quiesced state, just as if you had executed a DMUTILITY QUIESCE command. The QUIESCE QDC command stores the title of the intended quiesce database copy as a registered quiesce database copy in the control file of the live database. One can register and create multiple consistent copies of a live database at the same host by following these steps:

1. Run the QUIESCE QDC command using the QDC title clause.

2. Split your mirrored disks containing all of your database files.

3. Run the RESUME command to reactivate your live database.

4. Rename and acquire the split mirrored disks.

5. Run the DMCONTROL CREATE QDC command to create the quiesce database copy using the same QDC title clause and specifying the new family packs.

6. Use the DMCONTROL CREATE QDC command to complete the configuration of the consistent copy of the online database at the same host. This can be repeated for up to 15 copies. These copies of the online database can be used to offload activities such as backup generation and data warehousing. DMUTILITY dumps created from a quiesce database copy can be used for all forms of recovery of the live database that require a dump.

The following important issues pertain to a quiesce database copy:

It must be configured to use the same level of software that the live database uses.

It can be configured to use its own database software code files by using the DMCONTROL statement with the <code file title change> command option and file-equating CF and CFOLD to the control file of the quiesce database copy.

Once you have used the RESUME command to reactivate a quiesce database copy, it is no longer a quiesce database copy and operates as an independent non-related database. Dumps created from this resumed quiesce database copy cannot be used for recovery of the live database.

GLOSSARY OF RELEVANT ITEMS

Figure 1:
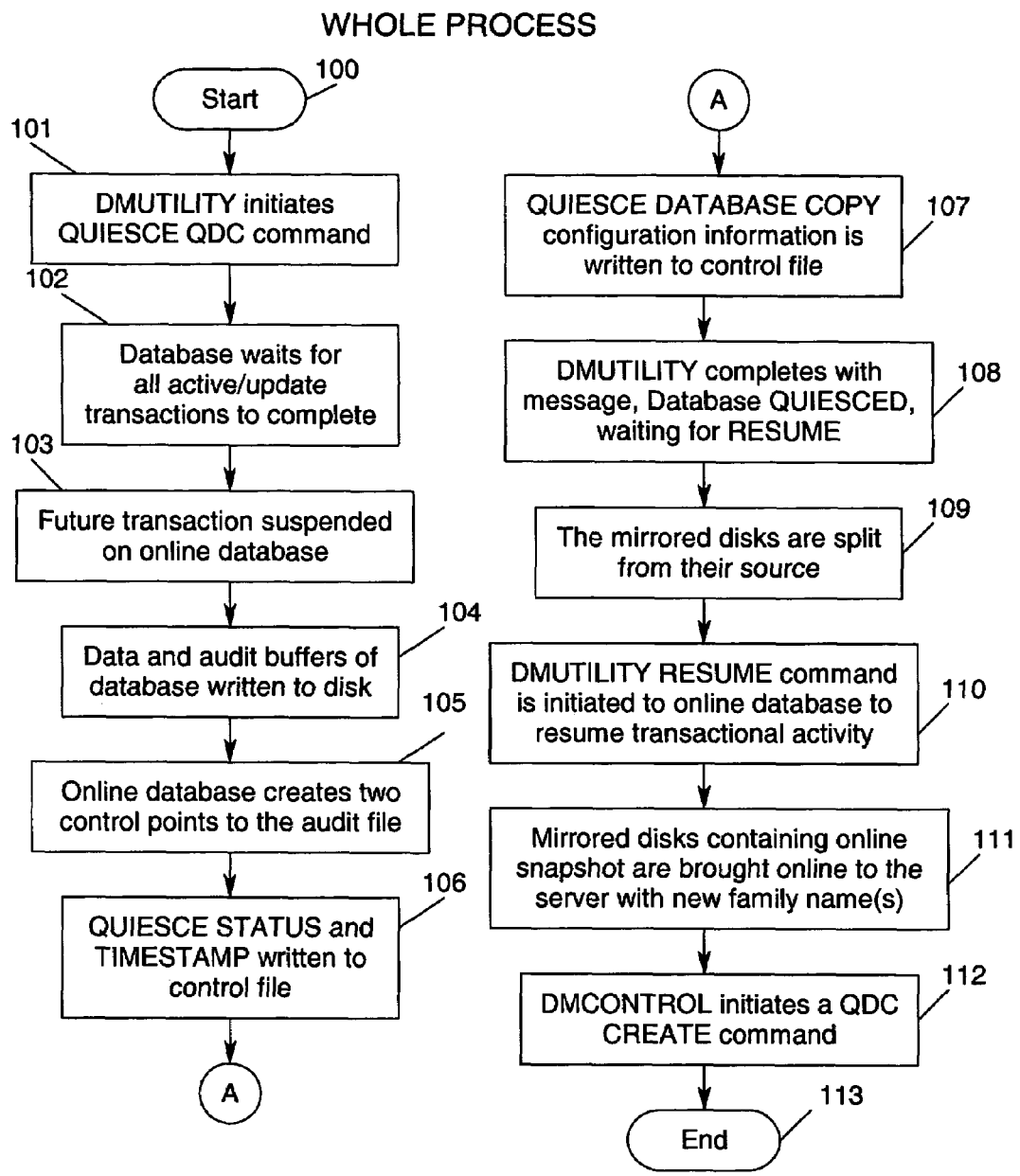
FIG. 1 is a flowchart showing the whole process of the present invention and the steps involved to create a multiple QUIESCE database copies.

1. ACCESSROUTINES: The software component of Unisys DMSII product that is primarily responsible for the accessing (creating, modifying and deleting) of data in a DMSII database. The Accessroutines is also responsible for auditing all changes to the database.

2. ACR: See ACCESSROUTINES.

3. ACTIVE TRANSACTIONS COMPLETED: See QUIET POINT.

4. ADMINISTRATIVE OPTIONS: In an RDB system, user-interface options that initiate administrative tasks.

5. APPLICATION DEVELOPMENT: The activity of writing and testing database applications.

6. APPLICATION TRANSACTION STATE: The condition every update program of an audited database must enter in order to perform any data record update statements (e.g., STORE, DELETE, etc.).

7. AUDIT BLOCK: A structured package containing potentially many Audit Records (in the extreme situation, it is also possible that a single Audit Block could contain a partial Audit Record). There are a number of control words at the beginning and end of each Audit Block. Classically, the maximum size of an audit block is specified in the DASDL (Data And Structure Development Language) for each individual database; with the Extended Edition, it is possible for the ACR to extend this size dynamically. The size of an audit block is "rounded up" to fit into an integral number of disk sectors; it could occupy as few as 1 sector or (in the extreme) as many sectors as are in a disk row (specified in the DASDL via AreaSize).

8. AUDIT BUFFER: A system memory buffer maintained by the DMSII software into which an audit block is placed for ACCESSROUNTINES access.

9. AUDIT FILE: (Item 214, FIG. 2): Logically considered to be the sequential storage of Audit Records. Actually, the sequential storage of Audit Blocks which contain the Audit Records.

10. AUDIT RECORD: A structured package of data built somewhere within the ACR (Access Routine) and stored (sequentially) into the Audit File. Header and trailer words of the record contain, among other things, the length and type of record.

11. AUDIT SECTION: With the Extended Edition, multiple MCP (Master Control Program) disk files can be used to physically implement a single Audit File. Each of these disk files is referred to as a Section of the Audit File. The sequence of Audit Blocks is spread, round robin fashion, among the multiple Audit Sections.

12. AUDIT TRAIL: The sequence of Audit Files that are created that span the life of the database. Each Audit File is assigned an Audit File Number (AFN) starting at 1 when the database is created and incremented by one when each new Audit File is created. An Audit File may be Sectioned or not. The individual Sections of an Audit File all share the same AFN (Audit File Number) value, although they each have a unique section number within their Audit File.

13. AUDIT TRANSFER: In an RDB (Remote Data Base) system, a method of transmitting audit images from the source host to the target host.

14. AUDITED CONTROL POINTS: See CONTROL POINTS.

15. BACKUP: A copy of the primary database files stored on magnetic tape or disk storage.

16. BACKUP GENERATION: The process of creating a database backup.

17. BCV: An acronym for Business Continuation Volume. EMC provides the ability to create a duplicate of a disk which can then be processed independently of the original disk. The duplicate is called a Business Continuation Volume (BCV). A BCV contains a mirror image of an active production volume. The BCV can be separated from the production volume, allowing separate tasks to operate on independent data images.

18. BI: Business Initiative.

19. BNA NETWORK: The network architecture used on Unisys ClearPath Enterprise Servers to connect multiple, independent, compatible computer systems into a network for distributed processing and resource sharing.

20. CF: Internal declaration for database control file

21. CFOLD: Same Glossary item #20.

22. CERTIFICATION: The process of verifying the physical consistency of a database or portion of a database.

23. CONFIGURATION OPTIONS: In an RDB (Remote Database Backup) system, user-interface options that initiate configuration tasks.

24. CONFIGURATION INFORMATION: For a QDC, the specification of a database title that includes a usercode and family name.

25. CONTROL FILE: See database control file, glossary item #32.

26. CONTROL FILE OF QDC: Database control file of the QDC.

27. CONTROL POINT: A logical construct within the Unisys e-@ction Enterprise Database Server used to limit the number of audit records which must be reprocessed in the event of a system failure. Data buffers which have been modified are guaranteed to be written to disk at least once every two control points, thus halt/load recovery need only process changes since the second to last control point in an audit trail. Control Points occur on a user-specified frequency defined in SYNC POINTS (See Glossary #104.

28. CSC: Customer Support Center. The Unisys organization tasked with answering customer questions and problem resolution. CSC is the first line of support for customers after consultation with any on-site representatives.

29. DASDL: Data And Structure Definition Language. The language used to specify the structure and specific software configuration for a database.

30. DATABASE ANALYSIS: The process of analyzing the physical structure of database files.

31. DATABASE AVAILABILITY: The availability of data files within a database system.

32. DATABASE CONTROL FILE: A special file required by the DMSII software on all databases. System-level information is stored in the Control File which the ACCESSROUTINES use to manage the database. The Control File also provides a place for exclusive users of the database, such as DMUTILITY to mark the database as unavailable.

33. DATABASE EXTRACTIONS: Data that is read from a database.

34. DATABASE INTEGRITY TESTING: The process of testing the physical consistency of data files within a database.

35. DATABASE PROCESSING: Database processing in a mirrored disk environment.

36. DATABASE SYSTEM PROCESS: (FIG. 4): A system process that manages all access to a single online database.

37. DATABUFFER: A system memory buffer maintained by the DMSII software into which a data block is placed for ACCESSROUTINES access.

38. DATA SET: A disk file (potentially, a group of disk files) containing data records all in a similar format. An e-@ction Unisys Enterprise Database Server structure type declared in DASDL (Data And Structure Definition Language).

39. DATA WAREHOUSING: Provision for availability of a copy of data specifically structured for querying and reporting.

40. DBA: DataBase Administrator. The person within an organization who is responsible for the development, maintenance, and security of databases.

41. DISASTER RECOVERY: The recovery of any event that had created an inability for an organization to provide critical business functions and data for some predetermined period of time. Generally, this involves reconstituting database files which were lost or unavailable.

42. DMCONTROL: A system software component responsible for creating and maintaining a database control file.

43. DM CONTROL CREATE QDC: A DMCONTROL command that completes the creation of a QDC by changing usercodes and family specifications for a mirrored copy of a Quiesced database.

44. DATABASE SOFTWARE TITLES: Titles of software components used by a given database.
45. DATA FILE INFORMATION: Information, static and dynamic, for each data file of a given database (e.g. timestamps, physical attributes, file name, location, etc.).
46. DISK ROW: The minimum allocation of disk space via the MCP (Master Control Program). A disk file is composed of a sequence of disk rows that may occupy arbitrary locations on the disk media. Within a disk row, all blocks are allocated at sequential disk addresses.
47. DMSII: Unisys Data Management System II. The comprehensive, primary database management software package in use on Unisys A Series family of mainframe computers.
48. DM UTILITY COMMANDS: Data Management Commands used to manage a physical database in Unisys Data Management Systems.
49. DMUTILITY RESUME: A DMUTILITY command, that, when executed resumes update activity for a database in a state of Quiesce.
50. DMUTILITY Quiesce QDC COMMAND: A command that suspends updates to a live database and stores the title of the intended QDC in the live control file and leaves the database in a state of Quiesce.
51. EMC: A global enterprise storage company.
52. EMC SRDF: See SYMMETRIX REMOTE DATA FACILITY.
53. EMC TIMEFINDER: A business continuance solution which allows customers to use special devices that contain a copy of Symmetrix devices from an attached host(s) while the standard Symmetrix devices are on-line for regular I/O operation from their host(s).
54. ENTERPRISE DATABASE SERVER: See DMSII, glossary item #47.
55. FAMILY NAME: The name of a family of disks used by an MCP server.
56. FLUSHING TO DISK: The process of writing system memory buffers (data and/or audit) to disk.
57. FUTURE TRANSACTIONS SUSPENDED: The process of preventing database applications from entering a transaction state.
58. HMP: Heterogeneous Multi-Processor. A group of inter-related platforms which communicate with each other.
59. INTEGRATION TEST: The act of combining individual units and components, and then testing them to ensure that the individual units and components still function as expected.
60. LOGICALLY CONSISTENT DATABASE: An online database whose consistency is maintained by data buffers and physical data files.
61. MARC: Menu Assisted Resource Control. A menu-based interface to Unisys A Series systems for the purpose of entering system commands.
62. MCP/AS: Unisys Master Control Program/Advanced Systems. The comprehensive virtual memory operating system which drives the Unisys A Series family of hardware.
63. MCP ENTERPRISE SERVER REMOTE DATABASE: In an RDB (Remote Data Backup) system, the database copy that resides at the remote host.
64. MCP TO RDB DATABASE OPERATIONS CENTER GUI: The complete set of Remote Database Backup Operations (Configuration, Administrative, and Monitoring) contained within the Database Operations Center graphical user interface.
65. MIRROR FAMILY: One or more physical disks that share a family name and contain mirrored images of all data from a source family of disks.
66. MIRRORED AUDIT TRANSFER: In an RDB (Remote Data Backup) system, a method of audit transfer where target audit data is available on a mirrored family of disks.
67. MIRRORED COPY: See MIRROR FAMILY.
68. MIRRORED DATA TRANSFER: A method of maintaining a mirrored family of disks containing data files.
69. MIRRORED DISK: A disk which is a mirror image of its source disk (e.g. Family Name, Serial number and capacity are identical).
70. MIRRORED SNAPSHOT: A mirrored copy of data that is split from its source data.
71. MONITORING OPTIONS: In an RDB system, user interface options that initiate the monitoring of audit generation and audit transfer activities.
72. OFFLINE DATABASE SYSTEM: A database system that is in a state of inactivity whereby no data files are being accessed from the database.
73. OFFLOAD PROCESSING: The process of dividing database access activities by creating one or more copies of a database.
74. ONLINE IN DATABASE SYSTEM: A database system that is in a state of activity whereby data files are being accessed from and/or modified to the database.
75. PDS (Product Definition System): The Unisys internal system containing ordering and configuration information for all Unisys products.
76. PHYSICALLY CONSISTENT DATABASE: A database whose consistency is established when no applications are in a transaction state and all data buffers are flushed to disk.
77. POINT-IN-TIME SNAPSHOT: A mirrored snapshot that is split at a specific point in time.
78. QDC TITLE CLAUSE: A specification of a QDC title that includes a usercode and family name.
79. QDC CONFIGURATION INFORMATION: See QDC TITLE CLAUSE, glossary item #78.
80. QUIESCE DATABASE: A database that is in a physically consistent state, i.e., all data buffers are flushed to disk.
81. QUISCE DATABASE COPY (QDC): A Quiesce Database that is configured with a usercode and family that are different from the specifications of the live database from which it was created.
82. QUIESCE QDC COMMAND: See Glossary Item #50.
83. QUIESCE DATABASE COPY CONFIGURATION INFORMATION: See Glossary Item #78.
84. QUIET POINT: Location in the Audit trail where no program is in transaction state.
85. RDB: Remote Database Backup. A Unisys product which provides real-time backup services for DMSII database as part of a disaster recovery plan. Remote Database Backup is suitable for use with A Series Databases.
86. REAL TIME REMOTE DATABASE ACCESS: Access to a remote database copy while the copy is kept current with its source database.
87. REGRESSION TEST: A representative subset of functionality tests to ensure stability and accuracy following the insertion or modification of code.
88. REMOTE COPY AUDIT: The activity of backing up a remote audit file that is a copy of its source.
89. RESUME COMMAND: See Glossary Item #49.
90. SAN: Storage Area Network.

91. SAN MIRROR DISK MANAGER: A Unisys ClearPath system software feature that makes it possible to split off a copy of a disk family within the same MCP (Master Control Program) environment as the source volumes, regardless of the type of disk.
92. SCHEDULED BACKUP: A backup that is scheduled to be performed at a predetermined time.
93. SINGLE HOST BACKUP: A backup that occurs at the same host as its database source.
94. SNAPSHOT COPY: The term "snapshot copy" is used to identify a copy of an MCP (Master Control Program) family which has been provided unique identification. This allows the "snapshot copy" to coexist within the same MCP environment as its original.
95. SOURCE COPY: In a mirrored database environment, the initial database copy that is mirrored onto a target database.
96. SPLIT MIRRORS: Target mirrored disk copies that are split from their original (source).
97. SSR: System Software Release. A package of system software and related documentation that is periodically released to the field for A Series computer systems.
98. STORE SAFE: A storage software feature that enables a site to ensure that multiple copies (mirrors) of disk data are coherent.
99. STORE SAFE MEMBER: A member of a mirrored set that has been assigned a store safe name.
100. SYMMETRIX: EMC Corporation's enterprise storage system.
101. SYMMETRIX I: In an SRDF (Symmetrix Remote Data Facility) environment, the disk storage subsystem that represents the source (primary).
102. SYMMETRIX II: In an SRDF environment, the disk storage subsystem that represents the target (secondary).
103. SYMMETRIX REMOTE DATA FACILITY (SRDF): EMC's disk-mirroring software solution for use with Symmetrix hardware.
104. SYNC POINT: A quiet point (in the audit trail) that is forced to occur every "n" transactions; the quiet point is the time period when Audit buffers are flushed.
105. TIMESTAMP: A system generated value that represents a specific point in time.
106. TRACKER: An asychronous RDB (Remote Database Backup) task declared and processed from Accessroutines. Its function is to rebuild the database.
107. TRANSACTION: A cycle which starts with a Read or a Write operation and continuing until completion. Thus, Read data is accessed by the Requestor or the Write data is flushed to reside onto the database disk.
108. USERCODE: A user identification name used to identify file access and login credentials on an MCP server.
109. UCF: User Communication Form. A form used by a Unisys customer to report problems and express comments about Unisys products to support organizations.
110. VDBS: Visible DataBase Stack. A set of commands which are issued directly to a database stack (DBS FIG. 2) to interrogate or change some aspect of the database configuration.

Notes

EMC=Trademark ™ of EMC corp.
Symmetrix is a copyright of EMC.
SRDF=™ of EMC.
ClearPath=™ of Unisys.
Windows NT=Copyright of Microsoft.

GENERAL OVERVIEW

The present invention involves a method of creating multiple QUIESCE database copies at a single server for the purpose of reducing application time and improving availability of live databases.

The title of a Quiesce database copy must use the same database name as the database statement, but must use a different family name and usercode. The control file of the live database specified by the database statement is updated with the registration of the quience database copy. One can have up to fifteen quiesce database copy registrations at a time. After fifteen, the oldest is replaced.

The control maintains physical space for configuration information of 15 copies. Each copy has a unique usercode/family name specification. Additionally, each copy has Timestamp information that represents the time that the database was Quiesced for that copy. If a $16^{th}$ unique copy is created, the configuration information will replace that of the earliest created QDC, according to the associated timestamps.

In normal practice, a logically consistent database is maintained for the "on-line" database system, by reading data from the physical disk storage and then temporarily storing the data in an active memory storage. During operations however, the data stored in memory can undergo many changes that are activated by the on-line database applications. However, these changes result in a database that is not physically consistent during the period while the database system still remains on-line and operative.

In general practice, the only method of securing a physically consistent database was to take the operating database system off-line in order to make a second copy of the database which would be consistent with the present state of the formerly on-line database.

It should be indicated that mirrored disk environments have been found to be very helpful in this situation. The physical consistency of a database is desirable by use of a mirrored-disk environment, whereby the mirrored copies can be split from their original source.

The mirrored copies then represent point-in-time snapshots of a physically consistent database, that is to say, that the mirrored copies are duplicative of the formerly on-line database, thus to form a physically consistent database situation.

The point-in-time snapshots can be used to off-load the processing operations away from the original database system enabling the original database system to be continually operative. Thus, by creating a physically consistent database (mirrored database) from an on-line database system, there is then no requirement or need to take the system off-line and deny service to various users. Thus, the database availability is continually useable and more efficient system operation is possible.

DESCRIPTION OF PREFERRED EMBODIMENT

Figure 2:
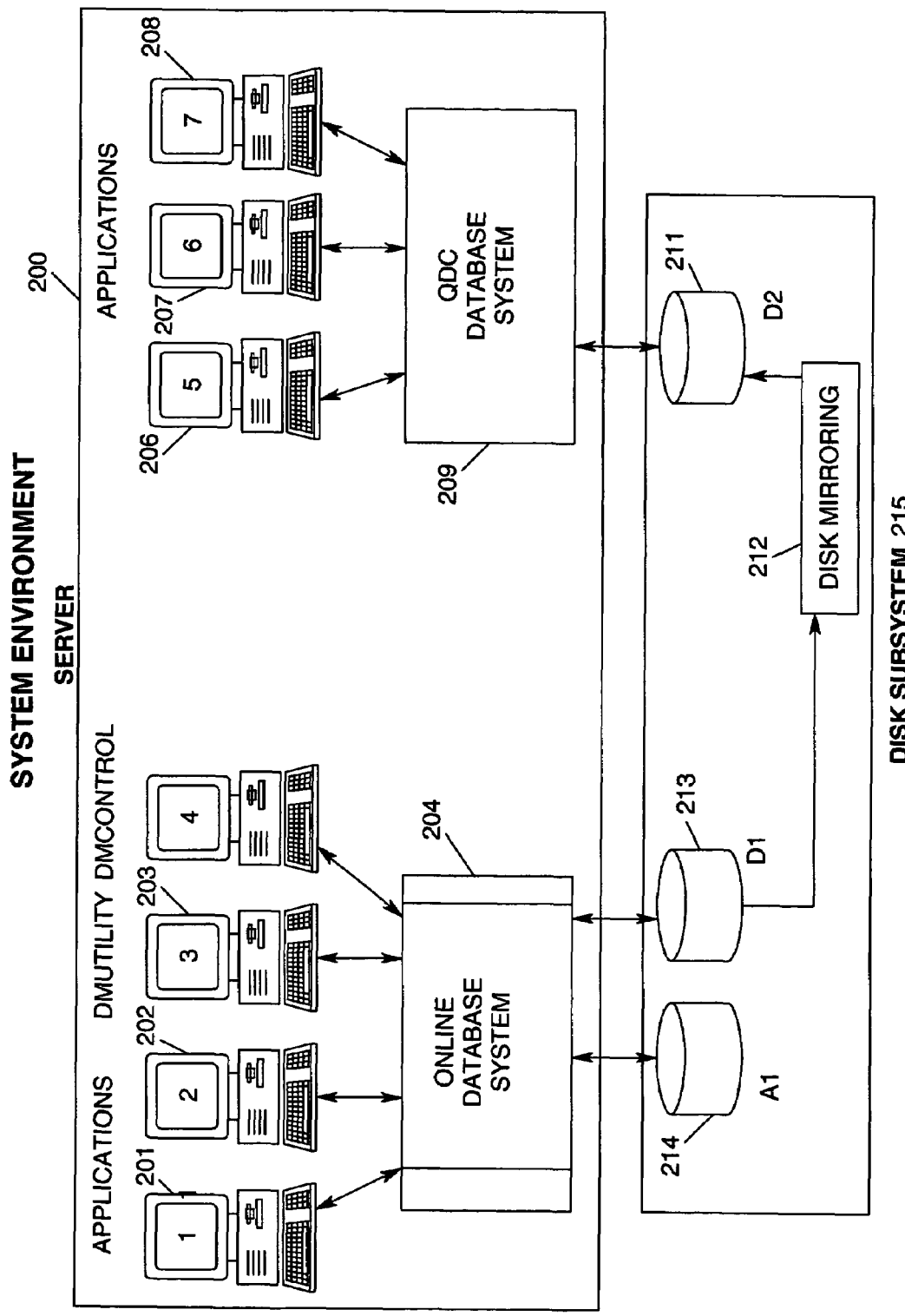
FIG. 2 is a drawing of the operating system environment showing a server connected to a disk subsystem and the types of information held therein to create multiple QUIESCE database copies.

FIG. 2 is a drawing of the system environment. The Server 200 is used to run several different applications and utilizes the personal computer client-users 201, 202, and 203, which interact with and access the database system 204 within the single server 200. The server also utilizes the PC client-users 206, 207 and 208, which interact with and access the QDC database system 209 within the single server 200.

Within the disk subsystem 215, the data files contained in Disk 213 (D1) are communicated back and fourth with the primary online database system 204, and also sent via the disk mirroring system 212 to Disk (D2), 211. Disk (D2) 211, contains the mirrored database snapshot.

The data files of database system 204 are mirrored via system 212 and communicated to the secondary QDC database system 209.

FIG. 1 is a flowchart illustrating the whole process and begins with start bubble 100. DMUTILITY (FIG. 2, Item 203) then initiates a QUIESCE QDC command at step 101, followed by a process that has the database wait for all active/update transaction to complete (Step 102). Future transactions are suspended on the online database 204 (Step 103), and the data and audit buffers (401, 402 of FIG. 4) of the database 204 are then written to disks D1 and A1 respectively (Step 104). The online database 204 then creates two control points to the audit file (Step 105), and the QUIESCE status and TIMESTAMP (Items 307 and 308 in FIG. 3) are written to control file (Step 106). Then, through connector A, the QUIESCE database copy configuration information is written to the control file (Step 107). DMUTILITY then is completed with a message that the Database QUIESCED is waiting for a RESUME command (Step 108), and the mirrored disk are split from their source (Step 109). Next, the DMUTILITY RESUME command is initiated to online database to resume transactional activity (Step 110), and the mirrored disks containing online snapshots are brought online to the server 200 with the new family name(s) at step 111. Finally, DMCONTROL (Item 208 of FIG. 2) initiates a QDC CREATE command at step 112 and the process ends at bubble 113. All usercode are changed for files stored on 211. Family info is updated in CF for each file.

Figure 3:
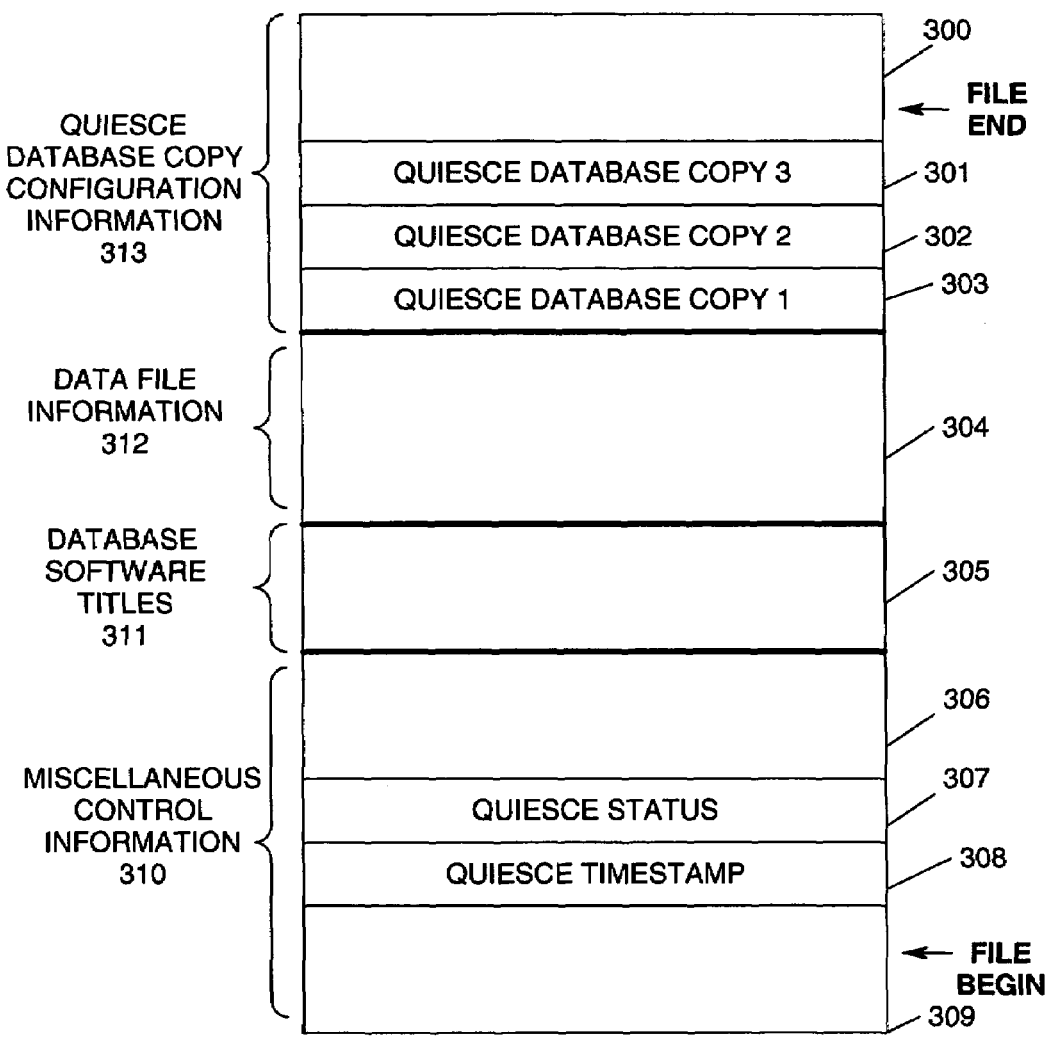
FIG. 3 is a schematic drawing of a database control file and the types of information held therein.

FIG. 3 is a schematic drawing which illustrates the database control file and the information held within it. This consists of miscellaneous control information (310) such as the beginning of the file (Item 309), QUIESCE TIMESTAMP (Item 308), QUIESCE STATUS (Item 307), and other pertinent information (Item 306). The control file also includes database software titles (311) in Item 305, and data file information (312) in Item 304. QUIESCE DATABASE COPY configuration information, such as usercode, familyname and timestamp (313) is also stored in the data base control file, which may include multiple copies of the QUIESCE DATABASE copies (Items 301, 302, and 303), as well the end of the file (Item 300). It should be understood that all Enterprise Database Server databases include a unique database control file that is system-maintained file that contains database control information. This file, titled <database name>/CONTROL, must be present whenever the database is used. The control file provides a convenient means of controlling the operational aspects of a database by performing the following functions:

Checking compatibility between tailored software and database files;

Verifying that all database data files are at the same level of update;

Storing audit control information, dynamic database parameters, and other information;

Controlling exclusive use of the database for certain functions (e.g. offline backup, database rollback, etc.).

Figure 4:
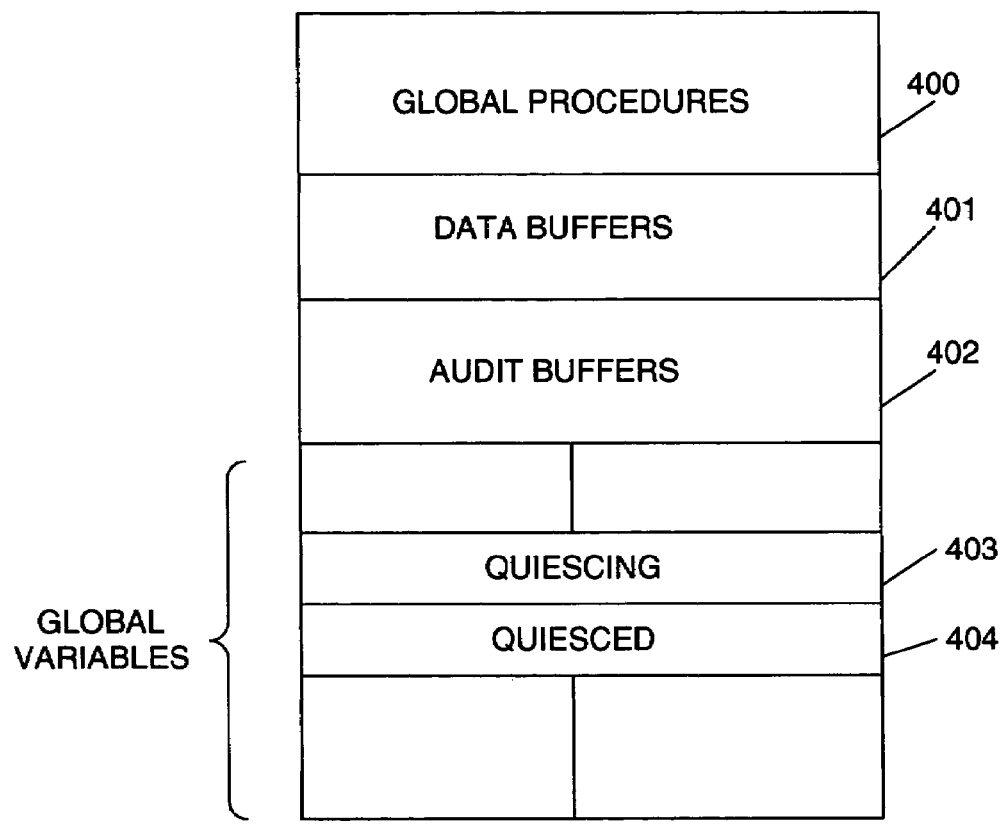
FIG. 4 is a schematic drawing of a database system process and the types of information held therein.

FIG. 4 is a schematic drawing which illustrates the database system process, also called the Data Base System Process and the information stored within it. This consists of global procedures (Item 400), data buffers which constitute the memory data buffers portion (Item 401), audit buffers (Item 402), and a number of global variables (Items 403, and 404) which have been QUIESCED or are QUIESCING. Global variables are used to control logic within the database system process. Again referring to FIG. 2, there is seen a section designated as the Global Variables (Items 403 and 404) which involve flags for QUIESCING and flags for QUIESCED. Quiesced and Quiescing are Boolean variables. When a DMUTILITY Quiesce QDC command is executed, "Quiescing" is set to TRUE. When Quiesce is completed, "Quiesced" is set to TRUE. These are further described in FIG. 3 as part of the Database Control File, but it is important to note that only Quiesced is stored in the (CF) Control File.

Described herein has been a specialized system in which a QUIESCE Database Copy (QDC) is an integrated data replication solution which establishes and mirrors, QUIESCE's database updates, splits mirrors, resumes database updates and acquires mirrors for the purpose of reducing recovery time, reduction of database replication time, increases production database availability (offload live database backup process), and improves production database performance with workload balancing.

While one embodiment of the described system and method has been illustrated, it should be understood that the invention may be implemented in other embodiments as defined in the attached claims.

What is claimed is:

1. A method in a single server, for creating multiple copies of a primary online database at a secondary database comprising the steps of:
   (a) QUIESCING momentarily said primary database wherein step (a) includes the steps of:
      (a1) utilizing a DMUtility program to initiate a QUIESCE database copy command;
      (a2) allowing all active/update transactions to complete on said primary database;
      (a3) suspending future transactions on said primary database;
      (a4) writing, to a first disk means (D1 and A1), the information residing in the data buffers and audit buffers of an audit file in said primary database;
      (a5) creating two control points to said audit file which are set to occur every "n" transactions whereby a set of audit files are flushed to said primary disk means (D1, A1), during QUIESCENCE of said primary database;
      (a6) setting-up information in a control file to indicate existence of the QUIESCE condition and to indicate a Time Stamp for said control point;
   (b) mirroring said QUIESCED primary database to create a secondary database holding a snapshot copy of said primary database at the moment of QUIESCENCE.

2. The method of claim 1 wherein step (a) further includes the steps of:
   (a7) writing, to said control file, the QUIESCE Database Copy configuration information;
   (a8) completing a DMUtility program sequence with a message to said DMUtility program that said primary database is QUIESCED and is waiting for a RESUME command.

3. A method in a single server, for creating multiple copies of a primary online database at a secondary database comprising the steps of:
   (a) QUIESCING momentarily said primary database;
   (b) mirroring said QUIESCED primary database to create a secondary database holding a snapshot copy of said primary database at the moment of QUIESCENCE including the steps of:

(b1) developing said snapshot copy, of said primary database, on a secondary disk (D2) by replicating a primary disk (D1);

(b2) splitting off (disconnecting) said secondary disk (D2) from said primary disk (D1);

(b3) initiating a RESUME command to said primary database to become operational for online transaction activity;

(b4) replicating from said snapshot copy, a multiplicity of mirrored disks (301, 302, 303) which are designated with new family names;

(b5) initiating a ODC (QUIESCE Database Copy) CREATE command to bring online to said single server, said multiplicity of mirrored disks.

* * * * *